United States Patent
Choi et al.

(10) Patent No.: US 12,024,605 B2
(45) Date of Patent: Jul. 2, 2024

(54) POLYAMIDE-BASED COMPOSITE FILM AND DISPLAY DEVICE COMPRISING SAME

(71) Applicants: SK MICROWORKS CO., LTD., Gyeonggi-do (KR); SK MICROWORKS SOLUTIONS CO., LTD., Chungcheongnam-do (KR)

(72) Inventors: Sang Hun Choi, Gyeonggi-do (KR); Dae Seong Oh, Gyeonggi-do (KR); Han Jun Kim, Gyeonggi-do (KR); Sun Hwan Kim, Gyeonggi-do (KR); Jin Woo Lee, Gyeonggi-do (KR); Heung Sik Kim, Gyeonggi-do (KR); Jung Hee Ki, Gyeonggi-do (KR); Yun Hee Seo, Chungcheongnam-do (KR)

(73) Assignees: SK MICROWORKS SOLUTIONS CO., LTD., Chungcheongnam-Do (KR); SK MICROWORKS CO., LTD., Gyeonggi-Do (KR)

(*) Notice: Subject to any disclaimer, the term of this patent is extended or adjusted under 35 U.S.C. 154(b) by 412 days.

(21) Appl. No.: 17/433,978

(22) PCT Filed: Apr. 20, 2021

(86) PCT No.: PCT/KR2021/004940
§ 371 (c)(1),
(2) Date: Aug. 25, 2021

(87) PCT Pub. No.: WO2021/221374
PCT Pub. Date: Nov. 4, 2021

(65) Prior Publication Data
US 2022/0348728 A1 Nov. 3, 2022

(30) Foreign Application Priority Data
Apr. 29, 2020 (KR) .................. 10-2020-0052709

(51) Int. Cl.
C08J 5/18 (2006.01)
C08K 3/30 (2006.01)
G02B 1/14 (2015.01)

(52) U.S. Cl.
CPC ............... *C08J 5/18* (2013.01); *C08K 3/30* (2013.01); *G02B 1/14* (2015.01); *C08J 2377/06* (2013.01);
(Continued)

(58) Field of Classification Search
CPC ..... C08K 3/30; C08K 2003/3045; G02B 1/14
See application file for complete search history.

(56) References Cited

U.S. PATENT DOCUMENTS

| | | |
|---|---|---|
| 5,818,560 A | 10/1998 | Kouno et al. |
| 2006/0176427 A1 | 8/2006 | Yoshimi et al. |

(Continued)

FOREIGN PATENT DOCUMENTS

| | | |
|---|---|---|
| CN | 109796593 A | 5/2019 |
| JP | H6-095093 A | 4/1994 |

(Continued)

OTHER PUBLICATIONS

Office Action for the Chinese Patent Application No. 202180002799.6 issued by the Chinese Patent Office on Jun. 15, 2023.

(Continued)

*Primary Examiner* — David Sample
*Assistant Examiner* — Donald M Flores, Jr.
(74) *Attorney, Agent, or Firm* — IP & T GROUP LLP

(57) ABSTRACT

The embodiments relate to a polyamide-based composite film with excellent curl characteristics, mechanical characteristics, and optical characteristics. The polyamide-based composite film comprises a base film comprising a polyamide-based polymer and a functional layer disposed on the base film, wherein when the polyamide-based composite (Continued)

film is placed on a surface light source such that the base film is in contact with the surface light source, light is irradiated from the surface light source, and the luminance value measured in the normal direction of the surface light source is 100%, the luminance value measured in the direction of 50° from the normal direction of the surface light source is 25% or more.

9 Claims, 2 Drawing Sheets

(52) U.S. Cl.
CPC ................ *C08K 2003/3045* (2013.01); *C08K 2201/005* (2013.01); *C08K 2201/011* (2013.01)

(56) References Cited

U.S. PATENT DOCUMENTS

| | | | |
|---|---|---|---|
| 2015/0116835 A1* | 4/2015 | Ogumi ................ | G02B 5/3033 359/601 |
| 2018/0113350 A1* | 4/2018 | Jee ........................... | C08J 7/046 |
| 2019/0055405 A1 | 2/2019 | Aepli et al. | |
| 2019/0233590 A1* | 8/2019 | Jeong ...................... | B29C 39/38 |
| 2020/0103694 A1 | 4/2020 | Daimatsu et al. | |

FOREIGN PATENT DOCUMENTS

| | | |
|---|---|---|
| JP | H9-185058 A | 7/1997 |
| JP | 2005-077853 A | 3/2005 |
| JP | 2009-036839 A | 2/2009 |
| JP | 2019-065262 A | 4/2019 |
| KR | 1020080069224 A | 7/2008 |
| KR | 101070800 B1 | 10/2011 |
| KR | 1020160011706 A | 2/2016 |
| KR | 1020180044216 A | 5/2018 |
| KR | 1020190083302 A | 7/2019 |
| KR | 10-2020-0037057 A | 4/2020 |

OTHER PUBLICATIONS

Office Action for the Japanese Patent Application No. 2021-551847 issued by the Japanese Patent Office on Sep. 13, 2022.
Office Action issued by the Korean Intellectual Property Office on Mar. 25, 2022.

\* cited by examiner

[Fig. 1]
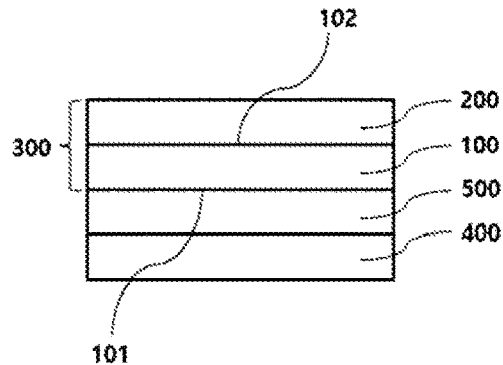
[Fig. 2]
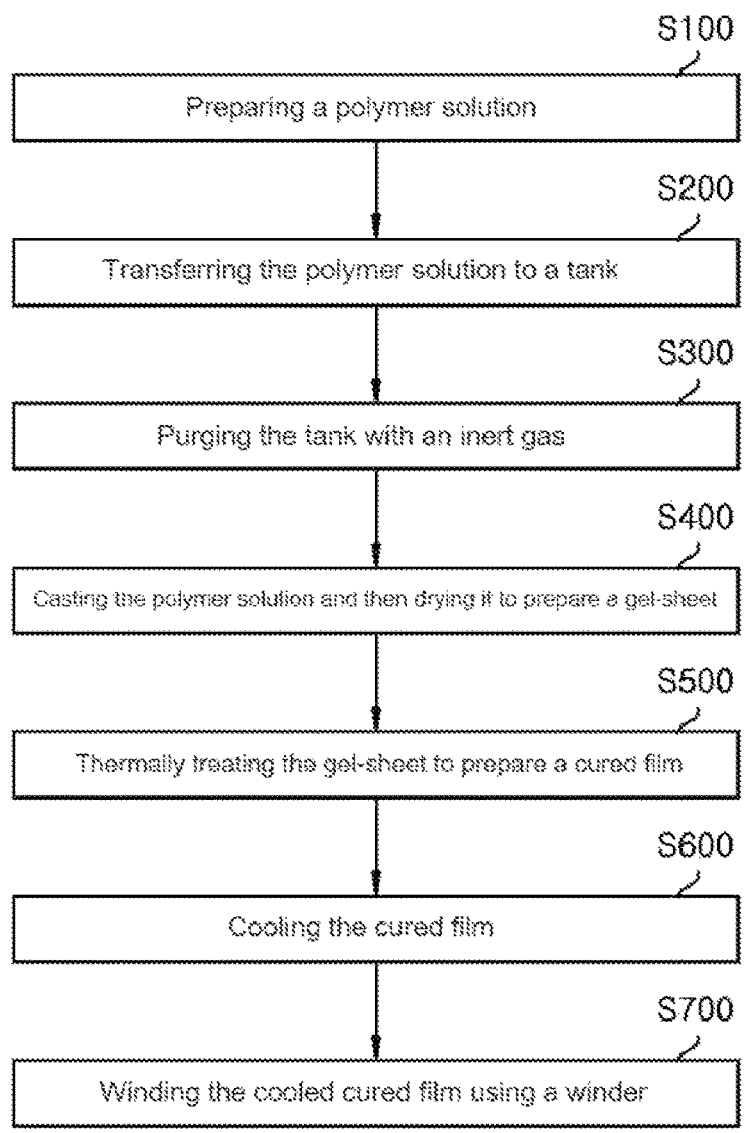

[Fig. 3]
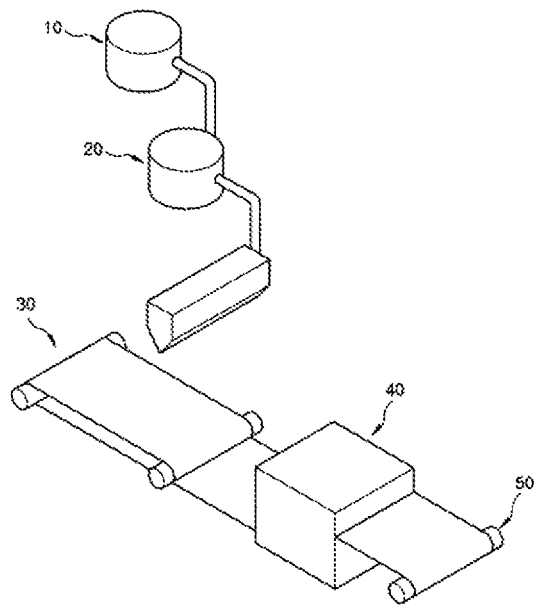
[Fig. 4]
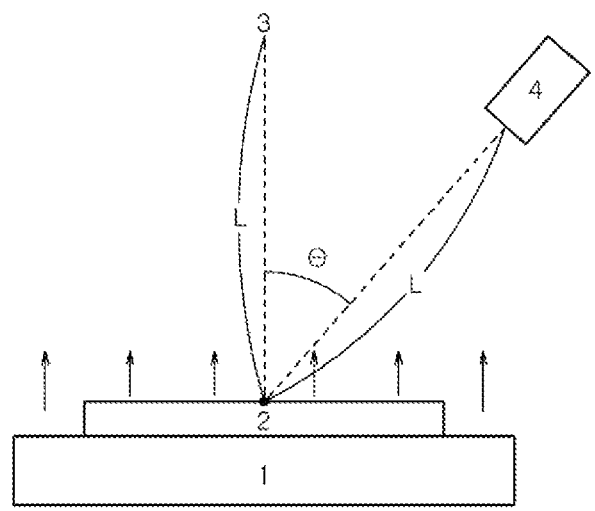

POLYAMIDE-BASED COMPOSITE FILM
AND DISPLAY DEVICE COMPRISING SAME

This application is a national stage application of PCT/KR2021/004940 filed on Apr. 20, 2021, which claims priority of Korean patent application number 10-2020-0052709 filed on Apr. 29, 2020. The disclosure of each of the foregoing applications is incorporated herein by reference in its entirety.

TECHNICAL FIELD

Embodiments relate to a polyamide-based composite film that not only is excellent in curl characteristics, mechanical characteristics, and optical characteristics, but also has a wide angle of view by securing at least a certain level of luminance at various angles and to a display device comprising the same.

BACKGROUND ART

Polyimide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the applications thereof. In addition, polyimide is used together with a fluoropolymer as a painter for decoration and corrosion prevention. It also plays a role of bonding a fluoropolymer to a metal substrate. In addition, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like, and to antireflection films, compensation films, and retardation films if retardation properties are implemented.

When a cover window to which the polyimide-based film has been applied is used in a display device, there arises a problem that the angle of view is lost and that when viewed from a lateral side of the screen, there is a lack of the angle of view in which the original color of the screen is not properly implemented.

In addition, as the size of a display screen is larger and larger, it would be more common to view the screen from a lateral side rather than the front of the screen. Thus, research on the development of a film capable of securing a wide angle of view is continuously required.

Further, in the case when a functional layer is applied to a display device, it is used for the purpose of protecting the surface of the display device. When a film to which such a functional layer has been applied is used in a flexible display, there has been a continuous demand for a technology that secures high mechanical strength and does not cause curling at the edges of the film during the manufacturing process or use.

DESCRIPTION OF THE INVENTION

Technical Problem

An object of the embodiments is to provide a polyamide-based composite film that not only is excellent in curl characteristics, mechanical characteristics, and optical characteristics, but also has a wide angle of view by securing at least a certain level of luminance at various angles and to a display device comprising the same.

Technical Solution to the Problem

An embodiment provides a polyamide-based composite film, which comprises a base film comprising a polyamide-based polymer; and a functional layer disposed on the base film, wherein when the polyamide-based composite film is placed on a surface light source such that the base film is in contact with the surface light source, light is irradiated from the surface light source, and a luminance value ($L_0$) measured in the normal direction of the surface light source is 100%, a luminance value ($L_{50}$) measured in the direction of 50° from the normal direction of the surface light source is 25% or more.

Another embodiment provides a display device, which comprises a display unit; and a polyamide-based composite film disposed on the display unit, wherein the polyamide-based composite film comprises a base film comprising a polyamide-based polymer; and a functional layer disposed on the base film, and when the polyamide-based composite film is placed on a surface light source such that the base film is in contact with the surface light source, light is irradiated from the surface light source, and a luminance value ($L_0$) measured in the normal direction of the surface light source is 100%, a luminance value ($L_{50}$) measured in the direction of 50° from the normal direction of the surface light source is 25% or more.

Advantageous Effects of the Invention

The polyamide-based composite film according to the embodiment is not only excellent in optical characteristics in terms of high transmittance, low haze, and low yellow index, but also excellent in mechanical characteristics in terms of excellent curl characteristics, high surface hardness, and low surface roughness.

In particular, the polyamide-based composite film according to the embodiment can exhibit at least a certain level of luminance at various angles, thereby securing a wide angle of view. Specifically, since the polyamide-based composite film according to the embodiment has a high luminance at an angle of about 50°, it may have an enhanced angle of view. When a general user views a display device from a lateral side, it is likely that the angle between the user's viewing direction and the normal line of the display surface is about 50°. Thus, when the polyamide-based composite film according to the embodiment is used in a display device, it may achieve a high lateral angle of view.

In addition, the based film applied to the polyamide-based composite film according to the embodiment can minimize the optical distortion since it has at most a certain level of in-plane retardation and thickness direction retardation and can also reduce the light leakage from a lateral side.

In particular, as the screen size of a display device is larger, it is more common to view the screen from a lateral side. When the polyamide-based composite film according to the embodiment is used in a display device, it may have excellent visibility even from a lateral side, so that it can be advantageously applied to a large-sized display device.

BRIEF DESCRIPTION OF THE DRAWING

FIG. 1 is a cross-sectional view of a display device according to an embodiment.

FIG. 2 is a schematic flow diagram of a process for preparing a base film according to an embodiment.

FIG. 3 schematically illustrates process facilities for preparing abase film according to an embodiment.

FIG. 4 schematically illustrates a method for measuring the luminance with respect to the angle of a polyamide-based composite film according to an embodiment.

BEST MODE FOR CARRYING OUT THE INVENTION

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers expressing quantities of components, reaction conditions, and the like used herein are to be understood as being modified by the term "about" unless otherwise indicated.

The terms first, second, and the like are used herein to describe various elements, and the elements should not be limited by the tell is. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Based Composite Film

The embodiments provide a polyamide-based composite film that not only is excellent in optical characteristics in terms of high transmittance, low haze, and low yellow index, along with excellent mechanical characteristics in terms of excellent curl characteristics, high surface hardness, and low surface roughness, but also can have a wide angle of view by securing at least a certain level of luminance at various angles.

The polyamide-based composite film according to an embodiment comprises a base film comprising a polyamide-based polymer; and a functional layer disposed on the base film.

In an embodiment, when the polyamide-based composite film is placed on a surface light source such that the base film is in contact with the surface light source, light is irradiated from the surface light source, and a luminance value ($L_0$) measured in the normal direction of the surface light source is 100%, a luminance value ($L_{50}$) measured in the direction of 50° from the normal direction of the surface light source is 25% or more.

Specifically, the luminance value ($L_{50}$) measured in the direction of 50° from the normal direction of the surface light source is 26% or more, 26.5% or more, or 27% or more.

When the polyamide-based composite film is placed on a surface light source such that the base film is in contact with the surface light source, light is irradiated from the surface light source, and the luminance value ($L_0$) measured in the normal direction of the surface light source is 100%, the luminance value ($L_{60}$) measured in the direction of 60° from the normal direction of the surface light source is 19% or more.

Specifically, the luminance value ($L_{60}$) measured in the direction of 60° from the normal direction of the surface light source is 19.5% or more, 20% or more, or 20.5% or more.

When the polyamide-based composite film is placed on a surface light source such that the base film is in contact with the surface light source, light is irradiated from the surface light source, and the luminance value ($L_0$) measured in the normal direction of the surface light source is 100%, the luminance value ($L_{10}$) measured in the direction of 10° from the normal direction of the surface light source is 93% or more.

Specifically, the luminance value ($L_{10}$) measured in the direction of 10° from the normal direction of the surface light source is 93.5% or more.

When the polyamide-based composite film is placed on a surface light source such that the base film is in contact with the surface light source, light is irradiated from the surface light source, and the luminance value ($L_0$) measured in the normal direction of the surface light source is 100%, the luminance value ($L_{20}$) measured in the direction of 20° from the normal direction of the surface light source is 70% or more.

Specifically, the luminance value ($L_{20}$) measured in the direction of 20° from the normal direction of the surface light source is 70.5% or more or 71% or more.

When the polyamide-based composite film is placed on a surface light source such that the base film is in contact with the surface light source, light is irradiated from the surface light source, and the luminance value ($L_0$) measured in the normal direction of the surface light source is 100%, the luminance value ($L_{30}$) measured in the direction of 30° from the normal direction of the surface light source is 44% or more.

Specifically, the luminance value ($L_{30}$) measured in the direction of 30° from the normal direction of the surface light source is 44.5% or more, 45% or more, or 45.5% or more.

When the polyamide-based composite film is placed on a surface light source such that the base film is in contact with the surface light source, light is irradiated from the surface light source, and the luminance value ($L_0$) measured in the normal direction of the surface light source is 100%, the luminance value ($L_{40}$) measured in the direction of 40° from the normal direction of the surface light source is 32% or more.

Specifically, the luminance value ($L_{40}$) measured in the direction of 40° from the normal direction of the surface light source is 32.5% or more, 33% or more, 33.5% or more, or 34% or more.

FIG. 4 schematically illustrates a method for measuring the luminance with respect to the angle of a polyamide-based composite film according to an embodiment.

Specifically, FIG. 4 illustrates a surface light source (1), a polyamide-based composite film (2) placed on the surface light source, the normal line (3) of the surface light source, and a luminance meter (4).

More specifically, when the point where the polyamide-based composite film meets the normal line is referred to as a center point, the luminance meter is positioned at a distance L from the center point in the normal direction to measure the luminance ($L_0$). In such event, the luminance value thus measured is referred to as an absolute luminance value in the normal direction in a unit of nit.

In addition, while the luminance meter is moved in the circumferential direction with reference to the center point of the surface light source, the absolute luminance value ($L_\theta$) for each angle is measured at a certain angle ($\theta$) from the normal direction of the surface light source and at a distance from the center point equal to L.

For example, the L may be about 1 m, but it is not limited thereto.

The luminance for each angle as described above is a value converted based on the luminance value ($L_0$) measured in the normal direction of the surface light source as 100%.

The polyamide-based composite film according to an embodiment has an absolute luminance value in the normal direction of 5,800 to 6,200 nits, 5,900 to 6,100 nits, or 5,900 to 6,000 nits.

In the polyamide-based composite film, the rate of change in luminance for each measurement angle represented by the following Equations 1 to 6 satisfies a specific numerical range.

Rate of change in luminance from 0° to 10° ($LR10$, %/°)=($L_{10}-L_0$)/10°  [Equation 1]

Rate of change in luminance from 10° to 20° ($LR20$, %/°)=($L_{20}-L_{10}$)/10°  [Equation 2]

Rate of change in luminance from 20° to 30° ($LR30$, %/°)=($L_{30}-L_{20}$)/10°  [Equation 3]

Rate of change in luminance from 30° to 40° ($LR40$, %/°)=($L_{40}-L_{30}$)/10°  [Equation 4]

Rate of change in luminance from 40° to 50° ($LR50$, %/°)=($L_{50}-L_{40}$)/10°  [Equation 5]

Rate of change in luminance from 50° to 60° ($LR60$, %/°)=($L_{60}-L_{50}$)/10°  [Equation 6]

LR10 may be −0.7%/° or more, −0.69%/° or more, or −0.68%/° or more. LR10 may range from −0.68%/° to −0.60%/°.

LR20 may be −2.30%/° or more, −2.29%/° or more, or −2.28%/° or more. LR20 may range from −2.29%/° to −2.00%/°.

LR30 may be −2.64%/° or more, −2.63%/° or more, or −2.60%/° or more. LR30 may range from −2.63%/° to −2.30%/°, −2.60%/° to −2.40%/°, or −2.60%/° to −2.50%/°.

LR40 may be −1.18%/° or more, −1.17%/° or more, or −1.16%/° or more. LR40 may range from −1.16%/° to −1.10%/°.

LR50 may be −0.75%/° or more, −0.72%/° or more, or −0.70%/° or more. LR50 may range from −0.75%/° to −0.58%/°, −0.75%/° to −0.60%/°, or −0.72%/° to −0.60%/°.

LR60 may be −0.74%/° or more, −0.72%/° or more, or −0.70%/° or more. LR60 may range from −0.74%/° to −0.58%/°, −0.74%/° to −0.60%/°, or −0.72%/° to −0.60%/°.

If the values of LR10, LR20, LR30, and LR40 satisfy the above ranges, in the range of a person's main angle of view to the display surface, the person feels less discomfort or fatigue of the eyes due to a decrease in the display luminance.

When the polyamide-based composite film is placed on a surface light source such that the base film is in contact with the surface light source, light is irradiated from the surface light source, and the luminance value ($L_0$) measured in the normal direction of the surface light source is 100%, if the luminance values measured in the directions at certain angles from the normal direction of the surface light source are within the above ranges, a display device to which the film is applied has excellent visibility not only from the front but also from a lateral side.

Meanwhile, when a film having a low luminance at a large angle from the normal direction is applied to a display device, it may cause a change in the color tone of an image, and as the screen size of the display device is larger, the lateral luminance is lower, and the unevenness of luminance is severe.

The polyamide-based composite film according to an embodiment has at least a certain level of luminance from a lateral side, specifically, a luminance value ($L_{50}$) measured in the direction of 50° from the normal direction of the surface light source of 25% or more and a luminance value ($L_{60}$) measured in the direction of 60° of 19% more. Thus, the unevenness of luminance between the front and a lateral side can be minimized, and a wide angle of view can be secured.

In particular, since the polyamide-based composite film according to an embodiment has a high luminance at an angle of about 50°, it may have an enhanced angle of view. When a general user views a display device from a lateral side, it is likely that the angle between the user's viewing direction and the normal line of the display surface is about 50°. Thus, when the polyamide-based composite film according to an embodiment is used in a display device as a cover window, it may have a high lateral angle of view.

As the screen size of a display device is larger, it is more common to view the screen from a lateral side. In the case of a portable display such as a tablet-type computer or a smartphone, it is becoming more common to change the viewing direction of the display in various ways depending on the posture to look at it. Thus, it is important to enhance the display performance of the angle of view in all directions. The polyamide-based composite film according to an embodiment secures a wide angle of view, improves the unevenness of luminance, and minimizes the optical distortion, so that it can be advantageously applied to various display devices.

In an embodiment, in the polyamide-based composite film, the Sz roughness of one side of the functional layer positioned opposite to the side in contact with the base film is 0.5 µm or lower.

Specifically, the Sz roughness may be 0.4 µm or less, 0.3 µm or less, or 0.25 µm or less, but it is not limited thereto.

If the Sz roughness of the polyamide-based composite film is within the above range, when the composite film is applied to a display device, it has excellent visibility when viewed from a lateral side as well as from the front, thereby making it possible to achieve a wide angle of view, and it exhibits excellent curl characteristics, whereby it is readily applicable to a flexible display device or a foldable display device.

In another embodiment, in the polyamide-based composite film, the surface hardness of one side of the functional layer positioned opposite to the side in contact with the base film is 2H or higher.

Specifically, the surface hardness may be 3H or higher, 4H or higher, or 5H or higher, but it is not limited thereto.

If the surface hardness of the polyamide-based composite film is within the above range, it is resistant to scratches or strong impacts when applied to a display device; thus, the display device can be well protected.

The polyamide-based composite film has a haze of 1% or less. For example, the haze may be 0.8% or less, 0.6% or less, or 0.5% or less, but it is not limited thereto.

The polyamide-based composite film has a transmittance of 80% or more. For example, the transmittance may be 82% or more, 85% or more, 88% or more, 89% or more, 90% or more, 91% or more, 90% to 99% or 91% to 99%, but it is not limited thereto.

The polyamide-based composite film has a yellow index of 5 or less. For example, the yellow index may be 4 or less, 3.5 or less, or 3 or less, but it is not limited thereto.

If the haze, transmittance, and yellow index of the polyamide-based composite film are within the above ranges, it is colorless and transparent and has excellent optical characteristics; thus, it is possible to achieve a film with a wide angle of view.

Referring to FIG. 1, the polyamide-based composite film according to an embodiment comprises a base film (100) and a functional layer (200) disposed on the base film (100).

The base film (100) may be a support layer that supports the functional layer (200). In addition, the base film (100) may comprise a polyamide-based polymer. For example, the base film (100) may be a polyamide-based film.

The functional layer (200) may be formed as a coating on the base film (100). The functional layer (200) may be laminated on the base film (100). The functional layer (200) may be bonded on the base film (100).

The functional layer (200) may be a coating layer coated on the base film (100). The functional layer (200) may comprise a curable resin. Specifically, the functional layer (200) may be a curable coating layer.

The functional layer (200) may function to enhance the mechanical properties and/or optical properties of the base film (100). The functional layer may comprise an antireflection layer, an antifouling layer, a hard coating layer, and a scratch-resistant layer.

As shown in FIG. 1, the functional layer (200) comprises a second side (102). The second side (102) is a side located on the side of the functional layer (200) on which the base film (100) is disposed. The second side (102) is a side located on the side of the functional layer (200) in contact with the base film (100). The second side (102) may be the lower side of the functional layer (200). For example, the second side (102) may be the bottom side of the functional layer (200).

The base film (100) comprises a first side (101). The first side (101) is a side opposite to the side of the base film (100) on which the functional layer (200) is disposed. The first side (101) is a side located opposite to the side of the base film (100) in contact with the functional layer (200). The first side (101) may be the lower side of the base film (100). For example, the first side (101) may be the bottom side of the base film (100).

Base Film (100)

The base film (100) according to an embodiment comprises a polyamide-base polymer.

The base film (100) may further comprise a first filler. For example, the base film (100) comprises a polyamide-based polymer and a first filler.

The first filler has an average particle diameter of 60 nm to 180 nm. Specifically, the average particle diameter of the first filler may be 80 nm to 180 nm, 100 nm to 180 nm, 110 nm to 160 nm, 120 nm to 160 nm, or 130 nm to 150 nm, but it is not limited thereto.

If the average particle diameter of the first filler is within the above range, the optical characteristics are not deteriorated even when a relatively large amount thereof is employed as compared with other inorganic fillers.

The first filler has a refractive index of 1.55 to 1.75. Specifically, the refractive index of the first filler may be 1.60 to 1.75, 1.60 to 1.70, 1.60 to 1.68, or 1.62 to 1.65, but it is not limited thereto.

If the refractive index of the first filler satisfies the above range, the birefringence values related to $n_x$, $n_y$, and $n_z$ can be appropriately adjusted, and the luminance of the film at various angles is improved.

On the other hand, if the refractive index of the first filler is outside the above range, there may arise a problem that the filler is visually noticeable on the film or that the haze is increased due to the filler.

The content of the first filler is 100 ppm to 3,000 ppm based on the total weight of the solids content of the polyamide-based polymer. Specifically, the content of the first filler may be 100 ppm to 2,500 ppm, 100 ppm to 2,200 ppm, 200 ppm to 2,500 ppm, 200 ppm to 2,200 ppm, 250 ppm to 2,100 ppm, or 300 ppm to 2,000 ppm, based on the total weight of the solids content of the polyamide-based polymer, but it is not limited thereto.

If the content of the first filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process.

The first filler may be barium sulfate.

The barium sulfate may be employed in the form of particles. In addition, the surface of barium sulfate particles is not subjected to special coating treatment, and they may be uniformly dispersed in the entire film.

As the base film comprises barium sulfate, the film can secure a wide angle of view without a deterioration in the optical properties.

The base film according to an embodiment has an x-direction refractive index ($n_x$) of 1.60 to 1.70, 1.61 to 1.69, 1.62 to 1.68, 1.64 to 1.68, 1.64 to 1.66, or 1.64 to 1.65.

In addition, the base film has a y-direction refractive index ($n_y$) of 1.60 to 1.70, 1.61 to 1.69, 1.62 to 1.68, 1.63 to 1.68, 1.63 to 1.66, or 1.63 to 1.64.

Further, the base film has a z-direction refractive index ($n_z$) of 1.50 to 1.60, 1.51 to 1.59, 1.52 to 1.58, 1.53 to 1.58, 1.54 to 1.58, or 1.54 to 1.56.

If the x-direction refractive index, the y-direction refractive index, and the z-direction refractive index of the base film are within the above ranges, when the film is applied to a display device, its visibility is excellent not only from the front but also from a lateral side, so that a wide angle of view can be achieved.

The base film according to an embodiment has an in-plane retardation ($R_o$) of 800 nm or less. Specifically, the in-plane retardation ($R_o$) of the base film may be 700 nm or less, 600 nm or less, 550 nm or less, 100 nm to 800 nm, 200 nm to 800 nm, 200 nm to 700 nm, 300 nm to 700 nm, 300 nm to 600 nm, or 300 nm to 540 nm.

In addition, the base film according to an embodiment has a thickness direction retardation ($R_{th}$) of 5,000 nm or less. Specifically, the thickness direction retardation ($R_{th}$) of the base film may be 4,800 nm or less, 4,700 nm or less, 4,650 nm or less, 1,000 nm to 5,000 nm, 1,500 nm to 5,000 nm, 2,000 nm to 5,000 nm, 2,500 nm to 5,000 nm, 3,000 nm to 5,000 nm, 3,500 nm to 5,000 nm, 4,000 nm to 5,000 nm, 3,000 nm to 4,800 nm, 3,000 nm to 4,700 nm, 4,000 nm to 4,700 nm, or 4,200 nm to 4,650 nm.

Here, the in-plane retardation ($R_o$) is a parameter defined by a product ($\Delta n_{xy} \times d$) of anisotropy ($\Delta n_{xy} = |n_x - n_y|$) of refractive indices of two mutually perpendicular axes on a film and the film thickness (d), which is a measure of the degree of optical isotropy and anisotropy.

In addition, the thickness direction retardation ($R_{th}$) is a parameter defined by a product of an average of the two birefringences $\Delta n_{xz}(=|n_x-n_z|)$ and $\Delta n_{yz}(=|n_y-n_z|)$ observed on a cross-section in the film thickness direction and the film thickness (d).

If the in-plane retardation and the thickness direction retardation of the base film are within the above ranges, when the film is applied to a display device, it is possible to minimize the optical distortion and color distortion and can also minimize the light leakage from a lateral side.

The content of residual solvents in the base film is 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of residual solvents in the base film exceeds the above range, the durability of the film may be deteriorated, and it may have an impact on the luminance.

When the base film according to an embodiment based on a thickness of 50 μm is folded to have a radius of curvature of 3 mm, the number of folding before the fracture is 200,000 or more.

The number of folding counts one when the film is folded to have a radius of curvature of 3 mm and then unfolded.

As the number of folding of the base film satisfies the above range, it can be advantageously applied to a foldable display device or a flexible display device.

The base film according to an embodiment has a surface roughness of 0.01 μm to 0.07 μm. Specifically, the surface roughness may be 0.01 μm to 0.07 μm or 0.01 μm to 0.06 μm, but it is not limited thereto.

As the surface roughness of the base film satisfies the above range, it is advantageous for achieving high luminance even when the angle from the normal direction of the surface light source is increased.

The base film according to an embodiment comprises a polyamide-based polymer, and the polyamide-based polymer is a polymer that contains an amide repeat unit. In addition, the polymer contained in the film may optionally comprise an imide repeat unit.

The base film comprises a polyamide-based polymer, and the polyamide-based polymer may be prepared by simultaneously or sequentially reacting reactants that comprise a diamine compound and a dicarbonyl compound. Specifically, the polyamide-based polymer is prepared by polymerizing a diamine compound and a dicarbonyl compound.

Alternatively, the polyamide-based polymer is prepared by polymerizing a diamine compound, a dianhydride compound, and a dicarbonyl compound. Here, the polyamide-based polymer comprises an imide repeat unit derived from the polymerization of the diamine compound and the dianhydride compound and an amide repeat unit derived from the polymerization of the diamine compound and the dicarbonyl compound.

The base film according to an embodiment comprises a polyamide-based polymer formed by polymerizing a diamine compound, a dicarbonyl compound, and optionally a dianhydride compound.

As an embodiment, the molar ratio of the dianhydride compound and the dicarbonyl compound is 0:100 to 25:75, 0:100 to 20:80, 0:100 to 15:85, 0:100 to 10:90, 0:100 to 8:92, or 0:100 to 5:95.

If the molar ratio of the dianhydride compound and the dicarbonyl compound is within the above range, it is possible to achieve a film that has sufficient luminance and a minimized optical distortion even when the angle from the normal direction of the surface light source is large.

As another embodiment, the dianhydride compound may be composed of zero, one, or two types, and the dicarbonyl compound may be composed of one or two types.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

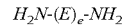
$H_2N\text{-}(E)_e\text{-}NH_2$                                [Formula 1]

In Formula 1, E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

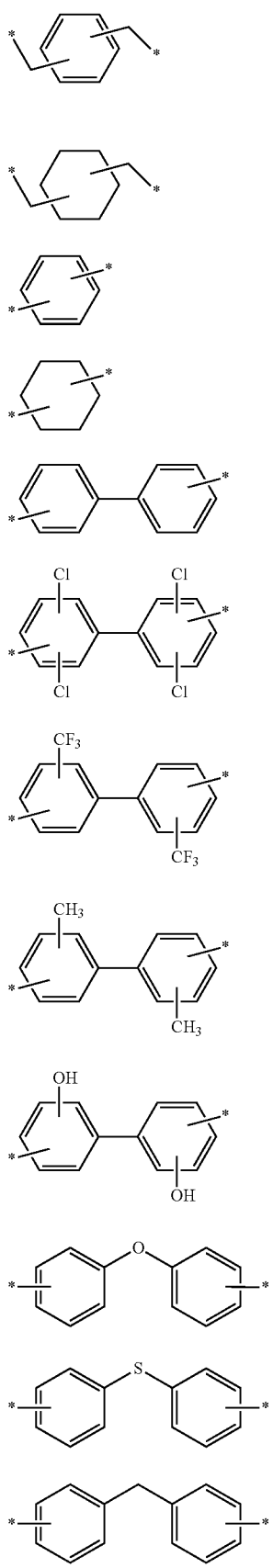
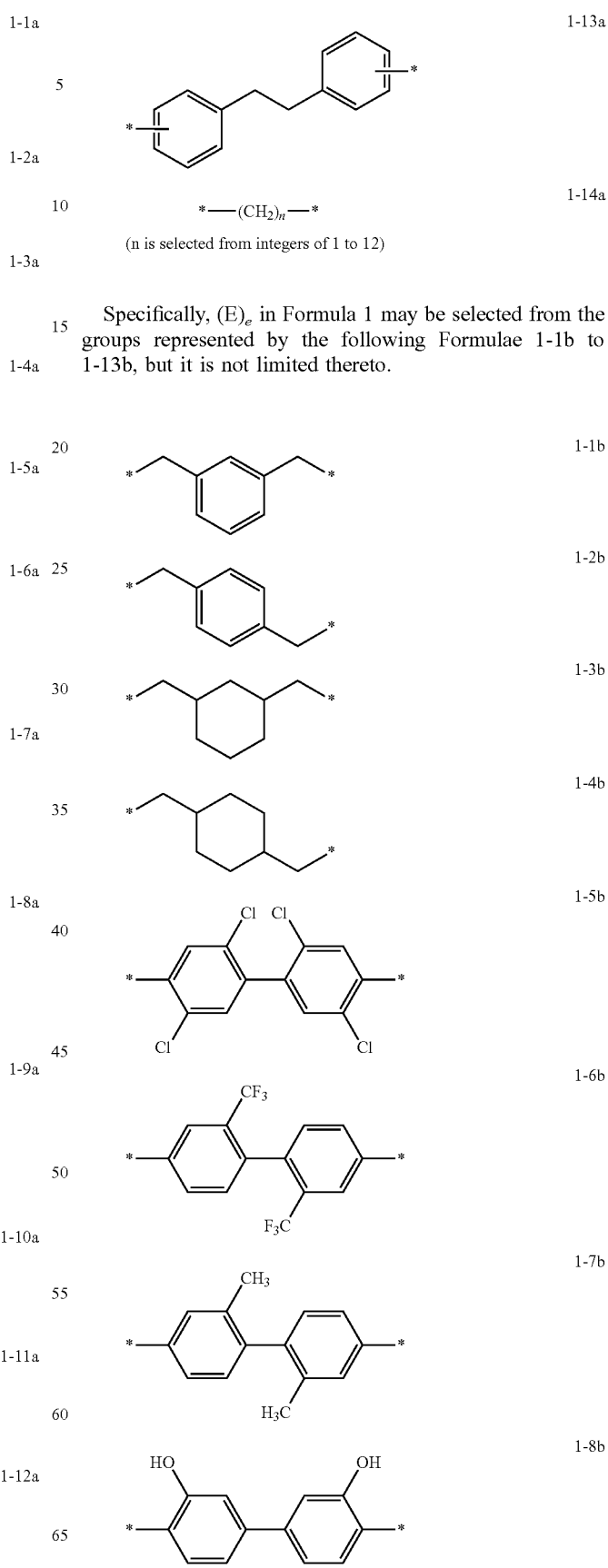
Specifically, $(E)_e$ in Formula 1 may be selected from the groups represented by the following Formulae 1-1b to 1-13b, but it is not limited thereto.

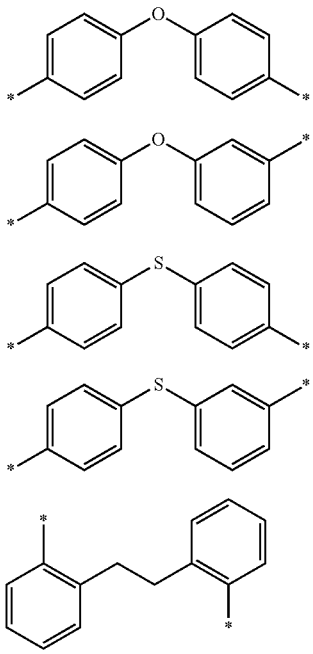

More specifically, (E)e in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

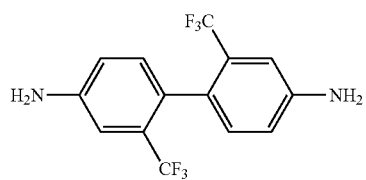

TFDB

The dianhydride compound has a low birefringence value, so that it can contribute to enhancements in the optical properties such as transmittance of a film that comprises the polyimide-based polymer. The polyimide-based polymer refers to a polymer that contains an imide repeat unit.

The dianhydride compound is not particularly limited, but it may be, for example, an aromatic dianhydride compound that contains an aromatic structure. For example, the aromatic dianhydride compound may be a compound represented by the following Formula 2.

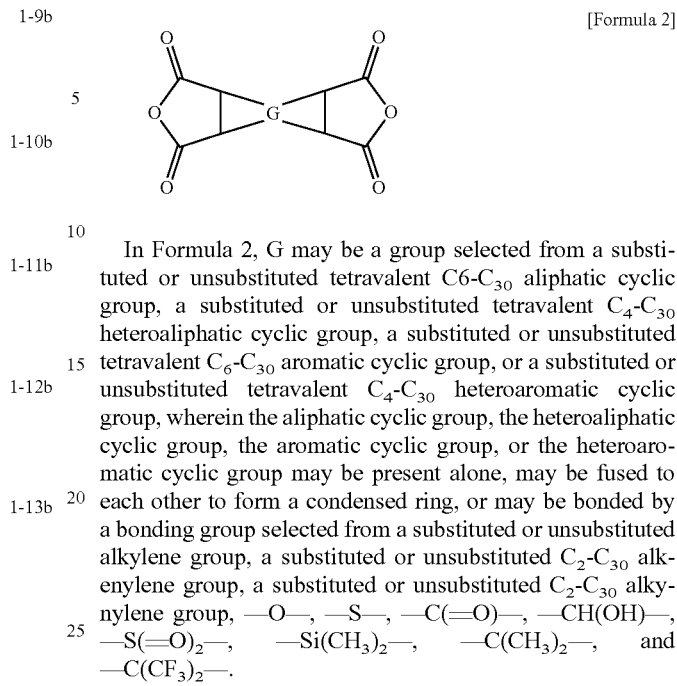

In Formula 2, G may be a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, may be fused to each other to form a condensed ring, or may be bonded by a bonding group selected from a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

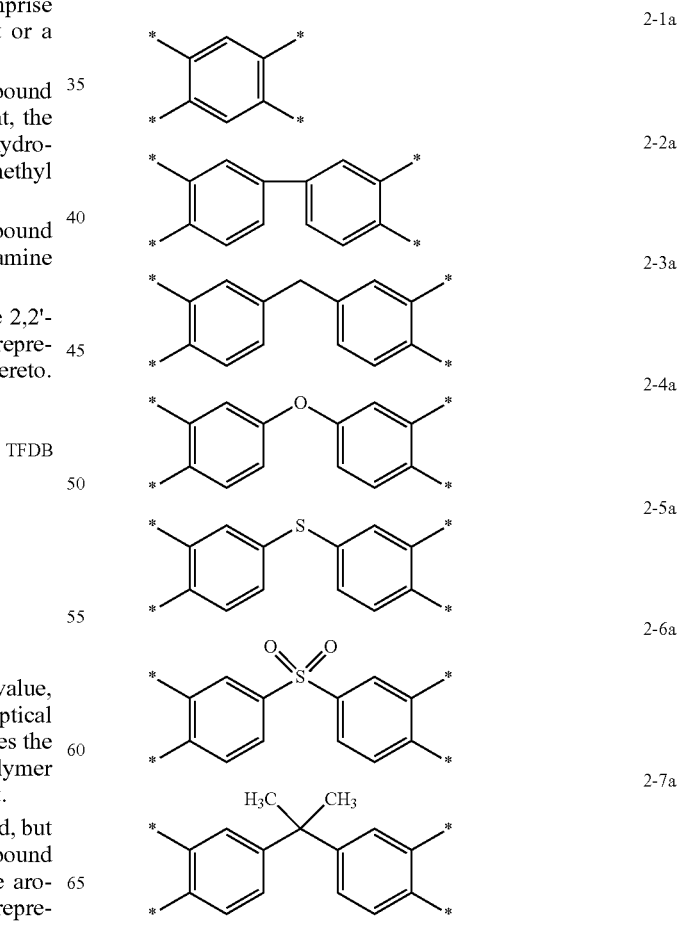

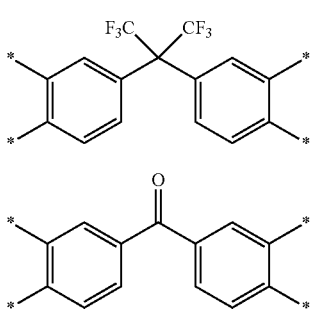

2-8a

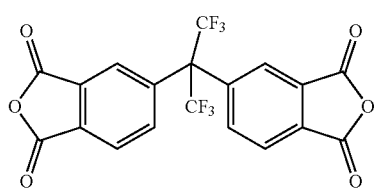

2-9a

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2'-bis-(3,4-dicarboxyphenyl)hexafluoropropane dianhydride (6-FDA) represented by the following formula, but it is not limited thereto.

6-FDA

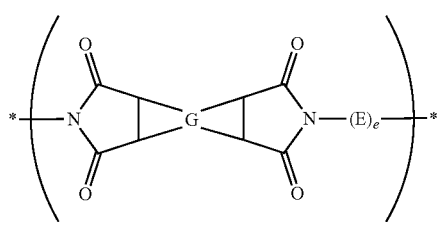

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

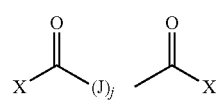

In Formula A, E, G, and e are as described above.

For example, the polyimide may comprise a repeat unit represented by the following Formula A-1, but it is not limited thereto.

[Formula A-1]

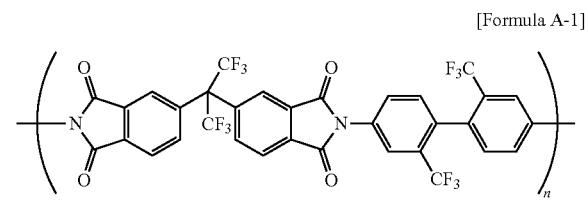

In Formula A-1, n is an integer of 1 to 400.

The dicarbonyl compound is not particularly limited, but it may be, for example, a compound represented by the following Formula 3.

[Formula 3]

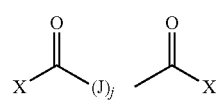

In Formula 3, J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in the above Formula 3 may be selected from the groups represented by the following Formulae 3-1a to 3-14a, but it is not limited thereto.

3-1a
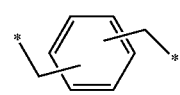

3-2a

3-3a
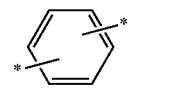

3-4a

3-5a
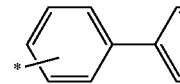

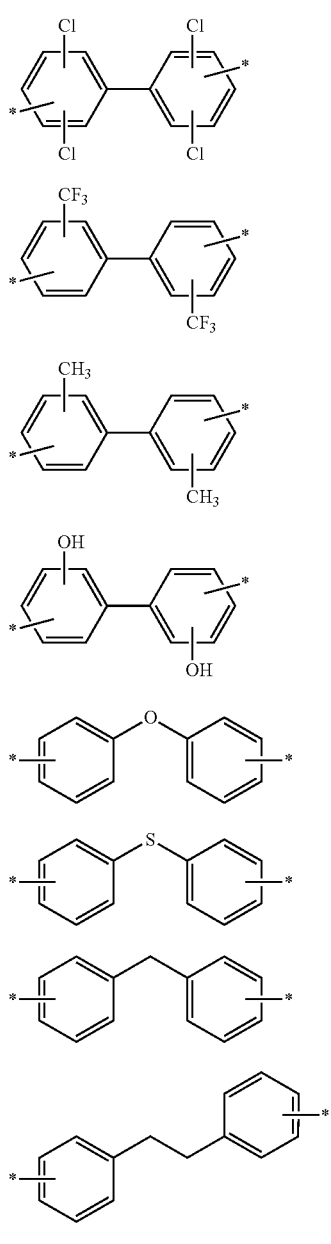

(n is selected from integers of 1 to 12)

Specifically, (J)$_j$ in the above Formula 3 may be selected from the groups represented by the following Formulae 3-1b to 3-8b, but it is not limited thereto.

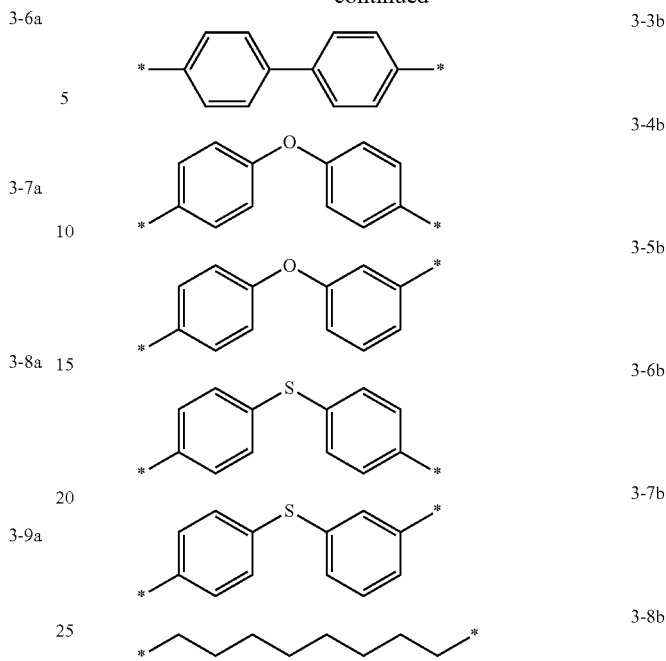

More specifically, (J)$_j$ in Formula 3 may be the group represented by the above Formula 3-1b, the group represented by the above Formula 3-2b, the group represented by the above Formula 3-3b, or the group represented by the above Formula 3-8b.

In an embodiment, a mixture of at least two kinds of dicarbonyl compounds different from each other may be used as the dicarbonyl compound. If two or more dicarbonyl compounds are used, at least two dicarbonyl compounds in which (J)$_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

TPC

[structure: terephthaloyl chloride - Cl-C(=O)-C6H4-C(=O)-Cl]

BPDC

[structure: biphenyl-4,4'-dicarbonyl dichloride]

IPC

[structure: isophthaloyl chloride]

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, a film that comprises the polyamide-based polymer thus produced may have high oxidation resistance.

Alternatively, the first dicarbonyl compound may comprise IPC, and the second dicarbonyl compound may comprise TPC, but they are not limited thereto.

If IPC is used as the first dicarbonyl compound and TPC is used as the second dicarbonyl compound in a proper combination, a film that comprises the polyamide-based polymer thus produced may not only have high oxidation resistance, but is also economical since the costs can be reduced.

The diamine compound and the dicarbonyl compound may be polymerized to form a repeat unit represented by the following Formula B.

[Formula B]

$$\left( \begin{array}{c} O \quad\quad O \\ * - N - \underset{H}{\overset{\|}{C}} - (J)_j - \underset{}{\overset{\|}{C}} - N - (E)_e \end{array} \right) *$$

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

[Formula B-1]

[structure with x subscript]

In Formula B-1, x is an integer of 1 to 400.

[Formula B-2]

[structure with y subscript]

In Formula B-2, y is an integer of 1 to 400.

[Formula B-3]

[structure with y subscript]

In Formula B-3, y is an integer of 1 to 400.

According to an embodiment, the polyamide-based polymer may comprise a repeat unit represented by the following Formula A and a repeat unit represented by the following Formula B:

[Formula A]

$$* \left( \begin{array}{c} O \quad\quad O \\ \| \quad\quad \| \\ N - G - N - (E)_e \\ \| \quad\quad \| \\ O \quad\quad O \end{array} \right) *$$

[Formula B]

$$* \left( \begin{array}{c} O \quad\quad O \\ - N - \overset{\|}{C} - (J)_j - \overset{\|}{C} - N - (E)_e \\ H \quad\quad\quad\quad\quad H \end{array} \right) *$$

In Formulae A and B, E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted alkylene group, a substituted or unsubstituted $C_2$-$C_{30}$ alkenylene group, a substituted or unsubstituted $C_2$-$C_{30}$ alkynylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, and G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(═O)—, —CH(OH)—, —S(═O)$_2$—, —Si(CH$_3$)$_2$—, —C(CH$_3$)$_2$—, and —C(CF$_3$)$_2$—.

In the polyamide-base polymer, the molar ratio of the repeat unit represented by the above Formula A to the repeat unit represented by the above Formula B may be 0:100 to 25:75, 0:100 to 20:80, 0:100 to 15:85, 0:100 to 10:90, 0:100 to 8:92, or 0:100 to 5:95, but it is not limited thereto.

Alternatively, the molar ratio of the imide-based repeat unit and the amide-based repeat unit in the polyamide-base polymer may be 0:100 to 25:75, 0:100 to 20:80, 0:100 to 15:85, 0:100 to 10:90, 0:100 to 8:92, or 0:100 to 5:95, but it is not limited thereto.

If the polyamide-based polymer comprises the repeat unit represented by Formula A and the repeat unit represented by Formula B at a molar ratio within the above range, or the imide-based repeat unit and the amide-based repeat unit at a molar ratio within the above range, it is possible to achieve a film that has sufficient luminance and a minimized optical distortion even when the angle from the normal direction of the surface light source is large.

The base film has a haze of 1% or less. For example, the haze may be 0.8% or less, 0.6% or less, 0.5% or less, or 0.4% or less, but it is not limited thereto.

The base film has a transmittance of 80% or more. For example, the transmittance may be 82% or more, 85% or more, 88% or more, 89% or more, 80% to 99%, 88% to 99%, or 89% to 99%, but it is not limited thereto.

The base film has a yellow index of 5 or less. For example, the yellow index may be 4 or less, 3.5 or less, or 3 or less, but it is not limited thereto.

The base film has a modulus of 5.0 GPa or more. Specifically, the modulus may be 5.5 GPa or more, 6.0 GPa or more, 6.5 GPa or more, or 7.0 GPa or more, but it is not limited thereto.

The base film has a compressive strength of 0.4 kgf/μm or more. Specifically, the compressive strength may be 0.45 kgf/μm or more, or 0.46 kgf/μm or more, but it is not limited thereto.

When the base film is perforated at a speed of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The base film has a surface hardness of HB or higher. Specifically, the surface hardness may be H or higher, or 2H or higher, but it is not limited thereto.

The base film has a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The base film has an elongation of 15% or more. Specifically, the elongation may be 16% or more, 17% or more, or 17.5% or more, but it is not limited thereto.

The base film according to an embodiment not only is excellent in optical properties in teams of low haze, low yellow index, and high transmittance, but also has sufficient luminance over a wide angle of view and a minimized optical distortion, thereby producing the effect of enhancing the aesthetic feeling and visibility.

The physical properties of the base film as described above are based on a thickness of 40 μm to 60 μm. For example, the physical properties of the base film are based on a thickness of 50 μm.

The features on the components and properties of the base film as described above may be combined with each other.

For example, the base film comprises a polyamide-based polymer and has a transmittance of 80% or more, a haze of 1% or less, and a yellow index of 5 or less.

In addition, the properties of the base film as described above are the results materialized by combinations of the chemical and physical properties of the components, which constitute the base film, along with the conditions in each step of the process for preparing the base film as described below.

For example, the composition and content of the components that constitute the base film, the types and contents of additives (specifically, fillers and the like), the stretching ratio and thermal treatment conditions in the film preparation process, and the like are all combined to achieve the desired level of luminance.

Process for Preparing a Base Film (100)

An embodiment provides a process for preparing a base film.

The process for preparing a base film according to an embodiment comprises preparing a solution comprising a polyamide-based polymer in an organic solvent; adding a filler dispersion in which a filler is dispersed to the solution; charging the solution comprising the filler dispersion into a tank; extruding and casting the solution in the tank and then drying it to prepare a gel sheet; and thermally treating the gel sheet.

Referring to FIG. 2, the process for preparing a base film comprises simultaneously or sequentially mixing a diamine compound and a dicarbonyl compound, or a diamine compound, a dianhydride compound, and a dicarbonyl compound, in an organic solvent in a polymerization apparatus, and reacting the mixture to prepare a polymer solution (S100); charging the polymer solution to a tank (S200); purging with an inert gas (S300); casting the polymer solution in the tank onto a belt and then drying it to prepare a gel sheet (S400); thermally treating the gel sheet while it is moved to prepare a cured film (S500); cooling the cured film while it is moved (S600); and winding the cooled cured film using a winder (S700).

The base film is a film that comprises a polyamide-based polymer as a main component. The polyamide-based polymer is a polymer that comprises an amide repeat unit as a structural unit. In addition, the polyamide-based polymer may comprise an imide repeat unit.

In the process for preparing a base film, a polymer solution for preparing the polyamide-based polymer is prepared by simultaneously or sequentially mixing a diamine compound and a dicarbonyl compound, or a diamine compound, a dianhydride compound, and a dicarbonyl compound, in an organic solvent in a polymerization apparatus, and reacting the mixture (S100).

In an embodiment, the polymer solution may be prepared by simultaneously mixing and reacting a diamine compound and a dicarbonyl compound, or a diamine compound, a dianhydride compound, and a dicarbonyl compound, in an organic solvent.

In another embodiment, the step of preparing the polymer solution may comprise mixing and reacting the diamine compound and the dicarbonyl compound in a solvent to produce a polyamide (PA) solution. The polyamide solution is a solution that comprises a polymer having an amide repeat unit.

In still another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

The polymer contained in the polymer solution comprises an amide repeat unit derived from the polymerization of the diamine compound and the dicarbonyl compound.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the second polymer solution may be 15% by weight to 25% by weight, but it is not limited thereto.

If the content of solids contained in the polymer solution is within the above range, a base film can be effectively produced in the extrusion and casting steps. In addition, the base film thus produced may have mechanical properties in terms of an improved modulus and the like and optical properties in terms of a low yellow index and the like.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.4 molar equivalent based on 1 mole of the polyamic acid, but it is not limited thereto.

The further addition of the catalyst may expedite the reaction rate and enhance the chemical bonding force between the repeat unit structures or that within the repeat unit structures.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound and a dicarbonyl compound, or a diamine compound, a dianhydride compound, and a dicarbonyl compound, in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

In another embodiment, the step of preparing the polymer solution may further comprise purging with an inert gas. The step of purging with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The molar ratio of the dianhydride compound to the dicarbonyl compound used to prepare the polymer solution may be 0:100 to 25:75, for example, 0:100 to 20:80, 0:100 to 15:85, 0:100 to 10:90, 0:100 to 8:92, or 0:100 to 5:95.

If the molar ratio of the dianhydride compound and the dicarbonyl compound is within the above range, it is possible to achieve a film that has sufficient luminance and a minimized optical distortion even when the angle from the normal direction of the surface light source is large.

If the above range is not satisfied, such optical properties as luminance and haze may be deteriorated.

Details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Once the solution comprising a polyamide-based polymer in an organic solvent has been prepared as described above, a first filler dispersion in which a first filler has been dispersed is added to the solution.

The first filler has an average particle diameter of 60 nm to 180 nm and a refractive index of 1.55 to 1.75. The content thereof is 100 ppm to 3,000 ppm based on the total weight of the solids content of the polyamide-based polymer. In addition, the first filler may be barium sulfate.

Details on the first filler are as described above.

The first filler dispersion may further comprise a dispersant.

The dispersant serves to help the first filler in the dispersion to be uniformly dispersed in the solution comprising a polyamide-based polymer.

In such event, the dispersant is preferably a neutral dispersant.

The content of the first filler solids contained in the first filer dispersion is 10% by weight to 30% by weight.

If the content of the first filler contained in the first filler dispersion is within the above range, the first filler may be uniformly dispersed and appropriately mixed with the solution comprising a polyimide-based polymer. In addition, the aggregation of the first filler is minimized, no feeling of foreign matter is present on the film surface when a film is prepared, and the optical properties and mechanical properties of the film can be enhanced together.

In addition, the first filler dispersion may further comprise a solvent.

The solvent may be an organic solvent. Specifically, it may be at least one selected from the group consisting of dimethylformamide (DMF), dimethylacetamide (DMAc), N-methyl-2-pyrrolidone (NMP), m-cresol, tetrahydrofuran (THF), and chloroform. Preferably, the solvent contained in the first filler dispersion may be dimethylacetamide (DMAc), but it is not limited thereto.

Next, the polymer solution comprising the first filler dispersion is charged to a tank (S200).

FIG. 3 schematically illustrates process facilities for preparing the base film according to an embodiment. Referring to FIG. 3, the polymer solution as described above is prepared in a polymerization apparatus (10), and the polymer solution thus produced is transferred to, and stored in, a tank (20).

Here, once the polymer solution has been prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 10° C., −20° C. to 5° C., −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a base film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a base film may further comprise purging the polymer solution transferred to the tank (20) with an inert gas (S300).

Specifically, the purging is carried out by purging the tank with an inert gas at an internal pressure of 1 atm to 2 atm. The inert gas purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate step, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the base film thus produced.

Thereafter, the process may further comprise storing the polymer solution in the tank (20) for 1 hour to 360 hours. Here, the temperature inside the tank may be kept at −20° C. to 20° C.

The process for preparing a base film may further comprise extruding and casting the polymer solution in the tank and then drying it to prepare a gel sheet (S400).

The polymer solution may be cast onto a casting body such as a casting roll or a casting belt.

Referring to FIG. 3, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/min to 700 g/min. If the injection rate of the polymer solution satisfies the above range, the gel sheet can be uniformly formed to an appropriate thickness.

In addition, the casting thickness of the polymer solution may be 200 μm to 700 μm. If the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The polymer solution is cast and then dried at a temperature of 60° C. to 150° C. for 5 minutes to 60 minutes to prepare a gel sheet. The polymer solution is dried at a temperature of 70° C. to 90° C. for 15 minutes to 40 minutes to prepare a gel sheet.

The solvent of the polymer solution is partially or totally volatilized during the drying to prepare the gel sheet.

The moving speed of the gel sheet on the casting body at the time of drying may be 0.1 m/min to 15 m/min, for example, 0.5 m/min to 10 m/min, but it is not limited thereto.

The process may further comprise stretching the gel sheet after the step of preparing the gel sheet.

In such event, the step of stretching the gel sheet may be carried out simultaneously with the step of thermally treating the gel sheet, which will be described later, or may be sequentially carried out.

In the step of stretching the gel sheet, the stretching ratio in the transverse direction (TD) is 1.005 to 1.05. In addition, the stretching ratio in the longitudinal direction (MD) is 1.005 to 1.05.

In addition, in the step of stretching the gel sheet, the ratio of stretching in the transverse direction (TD) to that in the longitudinal direction (MD) may be 0.96 to 1.04.

The ratio of stretching in the transverse direction (TD) to that in the longitudinal direction (MD) refers to the stretching ratio in the transverse direction (TD)/the stretching ratio in the transverse direction (TD).

If the stretching ratio in the transverse direction (TD), the stretching ratio in the longitudinal direction (MD), and the ratio of stretching in the transverse direction (TD) to that in the longitudinal direction (MD) are within the above ranges, it is possible to obtain a film that has sufficient luminance and a minimized optical distortion even at a large angle of view.

The process for preparing a base film comprises thermally treating the gel sheet while it is moved to prepare a cured film (S500).

Referring to FIG. 3, the thermal treatment of the gel sheet can be carried out by passing it through a thermosetting device (40).

When the gel sheet passes through the thermosetting device (40), it is treated with hot air.

If the thermal treatment is carried out with hot air, the heat may be uniformly supplied. If the heat is not uniformly supplied, a satisfactory surface roughness cannot be achieved, which may raise or lower the surface tension too much.

The thermal treatment of the gel sheet is carried out in a temperature range of 60° C. to 500° C. for 5 minutes to 200 minutes. Specifically, the thermal treatment of the gel sheet may be carried out in a temperature range of 80° C. to 300° C. at a temperature elevation rate of 1.5° C./min to 20° C./min for 10 minutes to 150 minutes.

In such event, the initial temperature of the thermal treatment of the gel sheet may be 60° C. or higher. Specifically, the initial temperature of the thermal treatment of the gel sheet may be 80° C. to 180° C.

In addition, the maximum temperature in the thermal treatment may be 300 to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

That is, referring to FIG. 3, the inlet temperature of the thermosetting device (40) may be the initial temperature of the thermal treatment, and the temperature of a certain region inside the thermosetting device (40) may be the maximum temperature in the thermal treatment.

According to an embodiment, the thermal treatment of the gel sheet may be carried out in two or more steps.

Specifically, the thermal treatment comprises a first hot air treatment step carried out for 5 minutes to 30 minutes in a range of 60° C. to 120° C.; and a second hot air treatment step carried out for 10 minutes to 120 minutes in a range of 120° C. to 350° C.

The thermal treatment under these conditions may cure the gel sheet to have appropriate surface hardness and modulus and may secure high light transmittance, low haze, and an appropriate level of glossiness of the cured film at the same time.

According to another embodiment, the thermal treatment may comprise passing it through an IR heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The process for preparing a base film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried in such a multistage manner, it is possible to have the physical properties of the cured film further stabilized and to maintain the optical properties and mechanical properties of the film achieved during the curing step more stably for a long period of time.

The process for preparing a base film comprises winding the cooled cured film using a winder (S700).

Referring to FIG. 3, the cooled cured film may be wound using a roll-shaped winder (50).

In such event, the ratio of the moving speed of the gel sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

In the process for preparing a base film, the thickness variation (%) according to the following Relationship 1 may be 3% to 30%. Specifically, the thickness variation (%) may be 5% to 20%, but it is not limited thereto.

[Relationship 1] Thickness variation (%)=($M1-M2$)/$M2 \times 100$

In Relationship 1, M1 is the thickness (μm) of the gel sheet, and M2 is the thickness (um) of the cooled cured film at the time of winding.

The base film prepared by the preparation process as described above is excellent in optical properties and mechanical properties. The base film may be applicable to various uses that require flexibility, transparency, and a certain level of luminance. For example, the base film may be applied to solar cells, displays, semiconductor devices, sensors, and the like.

Details on the base film prepared by the above preparation process are as described above.

Functional Layer (200)

The functional layer (200) may comprise an organic resin.

In addition, the functional layer (200) may further comprise a second filler.

The functional layer (200) may further comprise other additives.

The organic resin may be a curable resin. The organic resin may be a binder resin. The organic resin may be at least one selected from the group consisting of an acrylate-based monomer, a urethane acrylate-based oligomer, and an epoxy acrylate-based oligomer.

The acrylate-based monomer may be at least one selected from the group consisting of a substituted or unsubstituted acrylate and a substituted or unsubstituted methacrylate.

The acrylate-based monomer may contain 1 to 10 functional groups. The urethane acrylate-based oligomer may contain 2 to 15 functional groups. The epoxy acrylate-based oligomer may contain 1 to 10 functional groups.

Examples of the acrylate-based monomers include trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA).

Examples of the urethane acrylate-based oligomer include a bifunctional urethane acrylate oligomer having a weight average molecular weight (Mw) of 1,400 to 25,000 g/mole, a trifunctional urethane acrylate oligomer having a weight average molecular weight (Mw) of 1,700 to 16,000 g/mole, a tetra-functional urethane acrylate oligomer having a weight average molecular weight (Mw) of 500 to 2,000 g/mole, a hexa-functional urethane acrylate oligomer having a weight average molecular weight (Mw) of 818 to 2,600 g/mole, an ennea-functional urethane acrylate oligomer having a weight average molecular weight (Mw) of 3,500 to 5,500 g/mole, a deca-functional urethane acrylate oligomer having a weight average molecular weight (Mw) of 3,200 to 3,900 g/mole, and a pentakaideca-functional urethane acrylate oligomer having a weight average molecular weight (Mw) of 2,300 to 20,000 g/mole.

Examples of the epoxy acrylate-based oligomer include a monofunctional epoxy acrylate oligomer having a weight average molecular weight (Mw) of 100 to 300 g/mole, a bifunctional epoxy acrylate oligomer having a weight average molecular weight (Mw) of 250 to 2,000 g/mole, and a tetra-functional epoxy acrylate oligomer having a weight average molecular weight (Mw) of 1,000 to 3,000 g/mole.

The acrylate-based monomer may have a weight average molecular weight (Mw) of about 200 to about 2,000 g/mole, about 200 to about 1,000 g/mole, or about 200 to about 500 g/mole.

The acrylate equivalent weight of the acrylate-based monomer may range from about 50 to about 300 g/eq., from about 50 to about 200 g/eq., or from about 50 to about 150 g/eq.

The epoxy equivalent weight of the epoxy acrylate-based oligomer may range from about 50 to about 300 g/eq., from about 50 to about 200 g/eq., or from about 50 to about 150 g/eq.

The content of the organic resin may be 30% by weight to 100% by weight based on the total weight of the functional layer. Specifically, the content of the organic resin may be 40% by weight to 90% by weight, 50% by weight to 90% by weight, or 50% by weight to 80% by weight, based on the total weight of the functional layer.

Examples of the second filler include silica, barium sulfate, zinc oxide, and alumina.

The second filler may have a particle diameter of 5 nm to 100 nm. Specifically, the particle diameter of the second filler may be 5 nm to 70 nm, 5 nm to 50 nm, 5 nm to 30 nm, 5 nm to 20 nm, 5 nm to 15 nm, 10 nm to 20 nm, or 10 nm to 15 nm.

As another example, the second filler may comprise second fillers having particle size distributions different from each other. For example, the second filler may comprise a filler having a d50 of 20 to 80 nm and a filler having a d50 of 60 to 150 nm.

The content of the second filler may be about 10,000 ppm or more, about 30,000 ppm or more, or about 50,000 ppm or more, based on the total weight of the functional layer. In addition, the content of the second filler may be about 400,000 ppm or less, about 300,000 ppm or less, or about 200,000 ppm or less, based on the total weight of the functional layer.

The second filler may be subjected to surface treatment. The second filler may be subjected to surface treatment with a silane coupling agent or the like. Examples of the silane coupling agent include (meth)acrylsilane, methacroxysilane, vinylsilane, epoxy silane, and mercaptosilane.

Specifically, the second filler may be a silica-based material, and the particle diameter thereof may be 5 nm to 100 nm, but it is not limited thereto.

When the functional layer comprises the second filler, it is possible to not only enhance the surface hardness of the polyamide-based composite film, but also affect the surface roughness and light path, thereby enhancing the angle of view.

In an embodiment, in the polyamide-based composite film, the base film may further comprise a first filler, and the functional layer may further comprise a second filler.

Specifically, the first filler and the second filler may be the same or different. For example, the first filler and the second filler may be different from each other.

More specifically, the first filler may be barium sulfate, and the second filler may be silica, but they are not limited thereto.

The functional layer may further comprise a photoinitiator.

Examples of the photoinitiator include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, $\alpha,\alpha$-dimethoxy-$\alpha$-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, and bis(2,4,6-trimethylbenzoyl)-phenylphosphine oxide, but it is not limited thereto. In addition, commercially available products include Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. The photoinitiator may be used alone or in combination of two or more different types.

The functional layer may comprise a surfactant, a UV absorber, a UV stabilizer, an anti-yellowing agent, a leveling agent, an antifouling agent, or a dye for improving chromaticity values as other additives. In addition, the content of the additives may be variously adjusted within a range that does not impair the physical properties of the functional layer. For example, the content of the additives may be about 0.01% by weight to about 10% by weight based on the total weight of the functional layer, but it is not limited thereto.

The surfactant may be a mono- to bifunctional fluorine-based acrylate, a fluorine-based surfactant, or a silicone-based surfactant. The surfactant may be employed in a form dispersed or crosslinked in the functional layer.

Examples of the UV absorber include benzophenone-based compounds, benzotriazole-based compounds, and triazine-based compounds. Examples of the UV stabilizer include tetramethyl piperidine and the like.

A coating composition may be prepared in order to form the functional layer. The coating composition comprises the organic resin, the second filler, the additives, and an organic solvent.

Examples of the organic solvent include alcohol-based solvents such as methanol, ethanol, isopropyl alcohol, and butanol; alkoxy alcohol-based solvents such as 2-methoxyethanol, 2-ethoxyethanol, and 1-methoxy-2-propanol; ketone-based solvents such as acetone, methyl ethyl ketone, methyl isobutyl ketone, methyl propyl ketone, and cyclohexanone; ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, and diethylene glycol-2-ethylhexyl ether; and aromatic solvents such as benzene, toluene, and xylene, which may be used alone or in combination thereof.

The content of the organic solvent is not particularly limited since it may be variously adjusted within a range that does not impair the physical properties of the coating composition. The organic solvent may be employed such that the weight ratio of the solids content of the components contained in the coating composition to the organic solvent may be ab out 30:70 to about 99:1. If the content of the organic solvent is within the above range, the composition may have appropriate flowability and coatability.

Since the organic solvent is used in the course of preparing the functional layer, a trace amount of the organic solvent may remain in the functional layer.

Specifically, the coating composition may comprise an organic resin and a second filler.

The second filler may be employed in the form of a sol dispersed in a solvent. For example, the second filler is silica, and the silica may be employed in the form of a silica sol.

The coating composition may comprise a sol in which an organic resin and a second filler are dispersed at a weight ratio of 90:10 to 50:50.

Specifically, the coating composition may comprise a sol in which an organic resin and a second filler are dispersed at a weight ratio of 90:10 to 60:40, 90:10 to 70:30, or 80:20 to 70:30, but it is not limited thereto.

The coating composition may be applied to the front or rear side of the base film. The coating composition may be coated by a bar coating method, a knife coating method, a roll coating method, a blade coating method, a die coating method, a microgravure coating method, a comma coating method, a slot die coating method, a lip coating method, or a solution casting method.

Thereafter, the organic solvent contained in the coating composition may be removed. The organic solvent may be removed by evaporation.

Thereafter, the coating composition layer may be cured by light and/or heat.

The functional layer upon complete curing thereof may have a thickness of about 2 μm or more, or about 3 μm or more, for example, about 2 to about 20 μm, about 2 to about 15 μm, about 2 to about 10 μm, or about 3 to about 10 μm.

An additional layer may be further interposed between the base film and the functional layer. The additional layer may be an antistatic layer, which performs an antistatic function, or may be a low refractive index layer, which performs a low reflection function. Alternatively, the functional layer itself may perform an antistatic function and/or a low reflection function.

In addition, the functional layer has a refractive index of 1.45 to 1.60. Specifically, the refractive index of the functional layer may be 1.46 to 1.58, 1.46 to 1.55, 1.46 to 1.52, 1.48 to 1.51, or 1.49 to 1.51, but it is not limited thereto.

As the refractive index of the functional layer satisfies the above range, the luminance of the film at various angles can be improved.

Display Device

The display device according to an embodiment comprises a display unit; and a polyamide-based composite film disposed on the display unit, wherein the polyamide-based composite film comprises a base film comprising a polyamide-based polymer and a functional layer disposed on the base film.

When the polyamide-based composite film is placed on a surface light source such that the base film is in contact with the surface light source, light is irradiated from the surface light source, and the luminance value ($L_0$) measured in the normal direction of the surface light source is 100%, the luminance value ($L_{50}$) measured in the direction of 50° from the normal direction of the surface light source is 25% or more.

Here, details on the base film, the functional layer, the polyamide-based composite film, and the like are as described above.

Specifically, FIG. 1 illustrates a display device, which comprises a display unit (400) and a polyamide-based composite film (300) disposed on the display unit (400), wherein the polyamide-based composite film comprises a base film (100) having a first side (101) and a second side (102) and a functional layer (200), and an adhesive layer (500) is interposed between the display unit (400) and the polyamide-based composite film (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the polyamide-based composite film (300). The adhesive layer may be an optically transparent adhesive layer, but it is not particularly limited.

The polyamide-based composite film (300) is disposed on the display unit (400). The polyamide-based composite film is located at the outermost position of the display device according to an embodiment to thereby protect the display unit.

The polyamide-based composite film (300) may comprise a base film and a functional layer. The functional layer may be at least one selected from the group consisting of a hard coating layer, a reflectance reducing layer, an antifouling layer, and an antiglare layer. The functional layer may be coated on at least one side of the base film. The polyamide-based composite film according to an embodiment can be applied in the form of a film to the outside of a display device without changing the display driving method, the color filter inside the panel, or the laminated structure, thereby providing a display device having a wide angle of view and excellent visibility. Since neither significant process changes nor cost increases are needed, it is advantageous in that the production costs can be reduced.

The polyamide-based film according to an embodiment not only is excellent in optical characteristics in terms of high transmittance, low haze, and low yellow index, but also can secure a wide angle of view by virtue of at least a certain level of luminance at various angles, along with excellent curl characteristics, whereby it is readily applicable to a display device.

In particular, since the polyamide-based composite film according to an embodiment has a high luminance at an angle of about 50°, it may have an enhanced angle of view. When a general user views a display device from a lateral side, it is likely that the angle between the user's viewing direction and the normal line of the display surface is about 50°. Thus, when the polyamide-based composite film according to an embodiment is applied to a cover window, it may have a high lateral angle of view.

In addition, the base film according to an embodiment can minimize the optical distortion since it has at most a certain level of in-plane retardation and thickness direction retardation and can also reduce the light leakage from a lateral side.

In particular, as the screen size of a display device is larger, it is more common to view the screen from a lateral side. When the polyamide-based composite film according to an embodiment is applied to a display device, it may have excellent visibility even from a lateral side, so that it can be advantageously applied to a large-sized display device.

Embodiments for Carrying Out the Invention

Hereinafter, the above description will be described in more detail by referring to examples. However, these examples are set forth to illustrate the present invention, and the scope of the examples is not limited thereto.

EXAMPLE

Example 1

A 1-liter glass reactor equipped with a temperature-controllable double jacket was charged with 779.1 g of dimethylacetamide (DMAc) as an organic solvent at 20° C. under a nitrogen atmosphere. Then, 64 g (0.2 mole) of 2,2'-bis(trifluoromethyl)-4,4'-diaminobiphenyl (TFDB) was slowly added thereto and dissolved. Subsequently, 4.44 g (0.01 mole) of 2,2'-bis(3,4-dicarboxyphenyl)hexafluoropropane dianhydride (6-FDA) was slowly added thereto, and the mixture was stirred for 1 hour. Then, 12.2 g (0.06 mole) of isophthaloyl chloride (IPC) was added, followed by stirring for 1 hour. And 26.43 g (0.13 mole) of terephthaloyl chloride (TPC) was added, followed by stirring for 1 hour, thereby preparing a polymer solution.

Subsequently, a barium sulfate dispersion (solids content: 18.2% by weight and organic solvent: DMAc) was added to the polymer solution and stirred.

The polymer solution thus obtained was coated onto a glass plate and then dried with hot air at 80° C. for 30 minutes, which was detached from the glass plate. It was stretched by 5% in the MD direction and 5% in the TD direction, fixed to a pin frame, and dried with hot air in a range of 80° C. to 300° C. at a temperature elevation rate of 2° C./min, to thereby obtain a polyamide-based film (or base film) having a thickness of 50 μm.

As to the contents of TFDB, 6-FDA, IPC, and TPC, the number of moles of the dianhydride compound and the dicarbonyl compounds based on 100 moles of the diamine compound is shown in Table 1.

In addition, the content and average particle diameter of the filler (barium sulfate) are shown in Table 1.

A hard coating layer was formed on one side of the base film thus prepared. In order to form the hard coating layer, 54.32 parts by weight of a urethane acrylate oligomer (PU2050, Miwon Specialty Chemical), 23.28 parts by weight of a polyfunctional acrylate monomer (M300, Miwon Specialty Chemical), 19.4 parts by weight of a silica sol (MA-ST, Nissan Chemical) in which fine silica particles (average particle diameter: 10 nm to 15 nm) were dispersed in methanol in 30% by weight, and 3 parts by weight of a photoinitiator (I-184, BASF) were compounded with a stirrer to prepare a composition for forming a hard coating.

Thereafter, 100 parts by weight of methyl isobutyl ketone as a solvent was added thereto based on 100 parts by weight of the solids content of the composition for forming a hard coating, which was stirred and then applied to one side of the prepared polyamide-based film (or base film) by a die coating method. Thereafter, it passed through a drying chamber at 80° C. to dry the solvent for about 1 minute and then cured by irradiating an ultraviolet ray of a high-pressure mercury lamp at a light dose of 1,000 mJ/cm$^2$, thereby forming a coating film with a thickness of 5 μm. As a result, a polyamide-based composite film comprising a base film and a hard coating layer (or functional layer) was prepared.

In addition, the content of the filler (silica) is shown in Table 1.

Example 2

Base films were prepared in the same manner as in Example 1, except that the types and contents of the reactants and the like were changed as shown in Table 1 below.

Polyamide-based composite films were prepared in the same manner as in Example 1, except that the contents of the urethane acrylate oligomer, polyfunctional acrylate monomer, and silica sol were changed as shown in Table 1 in connection with the formation of the hard coating layer (or functional layer) on one side of the base film prepared as described above.

TABLE 1

|  |  | Example 1 | Example 2 |
|---|---|---|---|
| Composition and thickness of a base film | Diamine | TFDB 100 | TFDB 100 |
|  | Dianhydride | 6-FDA 5 | 6-FDA 0 |
|  | Dicarbonyl compound | IPC 30 | IPC 30 |
|  |  | TPC 65 | TPC 70 |
|  | Filler content (ppm) | 300 | 2,000 |
|  | Filler avg. particle diameter (nm) | 140 | 140 |
|  | Thickness (μm) | 50 | 50 |
| Composition and thickness of a functional layer | A: PU2050 (7) + M300 (3) | 80 | 70 |
|  | B: MA-ST (silica sol) | 20 | 30 |
|  | Thickness (μm) | 5 | 5 |
|  | Content of silica (ppm) | 70,000 | 100,000 |

Regarding A in the composition of the functional layer, PU2050 and M300 were mixed at a weight ratio of 7:3.
Regarding the composition of the functional layer, A and B were mixed at a weight ratio shown in Table 1.

Evaluation Example

The base films, functional layers, and polyamide-based composite films prepared in Examples 1 and 2 were each measured and evaluated for the following properties. The results are shown in Table 2 below.

Evaluation Example 1: Measurement of Film Thickness

The thickness was measured at 5 points in the transverse direction using a digital micrometer 547-401 manufactured by Mitutoyo Corporation. Their average value was adopted as the thickness.

Evaluation Example 2: Measurement of Transmittance and Haze

The light transmittance and the haze at 550 nm were measured using a haze meter NDH-5000W manufactured by Nippon Denshoku Kogyo.

Evaluation Example 3: Measurement of Yellow Index

The yellow Index (YI) was measured with a spectrophotometer (UltraScan PRO, Hunter Associates Laboratory) using a CIE colorimetric system.

Evaluation Example 4: Measurement of Refractive Indices ($n_x$, $n_y$, $n_z$), In-Plane Retardation, and Thickness Direction Retardation of Base Films The in-plane retardation ($R_o$) and the thickness direction retardation ($R_{th}$) were measured with a retardation measuring device (Axoscan of Axometrics, measuring wavelength: 550 nm). In addition, the refractive index as a basic data for measuring the retardation was measured with an Abbe refractometer (NAR-4T manufactured by Atago Co., Ltd., measuring wavelength: 589.3 nm).

Evaluation Example 5: Measurement of Refractive Index of Functional Layers

The refractive index was measured using prism coupler SPA-4000 of Seron.

Evaluation Example 6: Measurement of Surface Hardness

The pencil hardness was measured using a pencil hardness tester of Kipae ENT and Pressure-Proofed Hi-Density Lead Pencil of Mitsubishi Japan.

Specifically, after the polyamide-based composite film was prepared, the surface hardness of one side of the functional layer positioned opposite to the side in contact with the base film was measured. It was fixed to the glass substrate of Pencil Hardness Tester such that the functional layer faced upward, Mitsubishi pencil was installed at an angle of 45° to the surface of the functional layer, the surface of the functional layer was scratched 5 times under a load of 750 g, and the presence or absence of scratches was observed to determine the hardness.

Evaluation Example 7: Evaluation of Curling

The polyamide-based composite films of the Examples were each cut to a size of 10 cm×10 cm, it was placed on a glass plate such that the base film was in contact with the glass plate (that is, the functional layer faced upward), and the height distanced from the 4 corners of the glass plate was measured at 25° C. and 50% RH. The average value thereof was obtained.

Evaluation Example 8: Measurement of Surface Roughness (Sz)

The surface roughness was measured using a 3D optical profiler contour GT from Bruker. The Sz roughness of the surface was measured at arbitrary three locations on the polyamide-based composite films of the Examples, and an average value thereof was obtained.

An image was taken by the 3D optical profiler in the region of 220 μm×220 μm at each location, the image was calibrated with a Gaussian filter, and the Sz roughness was measured therefrom. When the roughness was measured, Sz is a value defined according to ISO 25178-2:2012. Sz is the maximum height and is the sum of maximum peak height (Sp) and maximum pit height (Sv).

Specifically, after the polyamide-based composite film was prepared, the surface roughness of one side of the functional layer positioned opposite to the side in contact with the base film was measured.

TABLE 2

|  |  | Example 1 | Example 2 |
|---|---|---|---|
| Properties of a base film | Transmittance (%) | 89 | 89.1 |
|  | Haze (%) | 0.4 | 0.4 |
|  | Yellow index | 2.4 | 2.9 |
|  | $n_x$ | 1.643 | 1.647 |
|  | $n_y$ | 1.637 | 1.636 |
|  | $n_z$ | 1.554 | 1.549 |
|  | In-plane retardation ($R_o$) (nm) | 300 | 550 |
|  | Thickness direction retardation ($R_{th}$) (nm) | 4,300 | 4,625 |
| Properties of a functional layer | Refractive index | 1.505 | 1.495 |
| Properties of a polyamide-based composite film | Transmittance (%) | 91.76 | 92.04 |
|  | Haze (%) | 0.40 | 0.41 |
|  | Surface hardness | 5H | 5H |
|  | Evaluation of curl | 4 mm | 5 mm |
|  | Surface roughness (Sz) (μm) | 0.12 | 0.25 |

In addition, the polyamide-based composite films prepared in Examples 1 and 2 were each measured and evaluated for the luminance. The results are shown in Table 3 below. The rate of change in luminance for each measurement angle is shown in Table 4 below.

Evaluation Example 9: Measurement of Luminance of Polyamide-Based Composite Films The prepared polyamide-based composite film was placed on a surface light source (such that the base film was in contact with the surface light source), and white light was irradiated from the surface light source. A luminance meter was placed at a distance of about 1 m in the normal direction from the center point of the surface light source, and the luminance value ($L_0$) in the normal direction was measured. In addition, while the luminance meter was moved in the circumferential direction with reference to the center point of the surface light source, the luminance values in the directions at an angle of 10°, 20°, 30°, 40°, 50°, and 60° from the normal direction of the surface light source were each measured. In addition, when the luminance value ($L_0$) in the normal direction is 100%, the luminance values measured in each direction are converted and are shown in Table 2 below.

A CA-310 manufactured by Konica Minolta was used for the measurement of luminance.

In addition, two luminance values measured in each direction at a certain angle from the normal direction were averaged as the luminance value for the angle.

The Reference Example in Table 3 below is a value measured in a state in which a polyamide-based composite film was not disposed on a surface light source.

TABLE 3

| Angle | Reference Example | Example 1 | Example 2 |
|---|---|---|---|
| Luminance at 0° (%) | 100 | 100 | 100 |
| Luminance at 10° (%) | 93.0 | 93.6 | 93.6 |
| Luminance at 20° (%) | 69.8 | 71.2 | 71.3 |
| Luminance at 30° (%) | 43.3 | 45.7 | 45.7 |
| Luminance at 40° (%) | 31.6 | 34.2 | 34.2 |
| Luminance at 50° (%) | 24.8 | 27.3 | 27.3 |
| Luminance at 60° (%) | 18.6 | 20.5 | 20.5 |

TABLE 4

|  | Example 1 | Example 2 |
|---|---|---|
| LR10 (%/°) | −0.64 | −0.64 |
| LR20 (%/°) | −2.24 | −2.23 |
| LR30 (%/°) | −2.55 | −2.56 |
| LR40 (%/°) | −1.15 | −1.15 |
| LR50 (%/°) | −0.69 | −0.69 |
| LR60 (%/°) | −0.68 | −0.68 |

As can be seen from Tables 1 to 4, the polyamide-based composite films of Examples 1 and 2 had sufficiently high luminance values even at an angle away from the normal direction. Specifically, the luminance value measured in the direction of 40° from the normal direction of the surface light source was 34% or more, the luminance value measured in the direction of 50° from the normal direction of the surface light source was 27% or more, and the luminance value measured in the direction of 60° from the normal direction of the surface light source was 20% or more, which were all high.

It was confirmed from these results that when the polyamide-based composite film according to the embodiment is applied to a cover window for a display device and to a display device, it is possible to secure a wide angle of view, and the visibility would be excellent even when viewed from a lateral side as well as from the front.

In addition, the polyamide-based composite films according to the Examples showed an average height of the four corners of 5 mm or less in the evaluation of curling and a surface roughness of 0.25 μm or less, indicating excellent curl characteristics and surface characteristics.

[Explanation of Reference Numerals]

1: surface light source
2: polyamide-based composite film
3: normal line
4: luminance meter
L: distance from the center point
θ: angle from the normal direction from the surface light source (°)
10: polymerization apparatus
20: tank
30: belt
40: thermosetting device
50: winder
100: base film
101: first side
102: second side
200: functional layer
300: polyamide-based composite film
400: display unit
500: adhesive layer

The invention claimed is:

1. A polyamide-based composite film comprising:
a base film; and
a functional layer disposed on the base film,
wherein the base film comprises a polyamide-based polymer and a first filler, the first filler having an average particle diameter of 60 nm to 180 nm, and
wherein when the polyamide-based composite film is placed on a surface light source such that the base film is in contact with the surface light source, light is irradiated from the surface light source, and a luminance value ($L_0$) measured in the normal direction of the surface light source is 100%, a luminance value ($L_{50}$) measured in the direction of 50° from the normal direction of the surface light source is 25% or more.

2. The polyamide-based composite film of claim 1, wherein a luminance value ($L_{30}$) measured in the direction of 30° from the normal direction of the surface light source is 44% or more.

3. The polyamide-based composite film of claim 1, wherein a luminance value ($L_{60}$) measured in the direction of 60° from the normal direction of the surface light source is 19% or more.

4. The polyamide-based composite film of claim 1, wherein a Sz roughness of one side of the functional layer positioned opposite to the side in contact with the base film is 0.5 μm or less.

5. The polyamide-based composite film of claim 1, wherein a surface hardness of one side of the functional layer positioned opposite to the side in contact with the base film is 2H or higher.

6. The polyamide-based composite film of claim 1, wherein the polyamide-based polymer comprises an imide-based repeat unit and an amide-based repeat unit at a molar ratio of 0:100 to 25:75.

7. The polyamide-based composite film of claim 1, wherein the functional layer further comprises a second filler, and the second filler has an average particle diameter of 5 to 100 nm.

8. The polyamide-based composite film of claim 1, wherein the functional layer further comprises a second filler, and the first filler and the second filler are different from each other.

9. A display device comprising:
a display unit; and
a polyamide-based composite film disposed on the display unit,
wherein the polyamide-based composite film comprises:
a base film; and
a functional layer disposed on the base film,
wherein the base film comprises a polyamide-based polymer and a first filler, the first filler having an average particle diameter of 60 nm to 180 nm, and
wherein when the polyamide-based composite film is placed on a surface light source such that the base film is in contact with the surface light source, light is irradiated from the surface light source, and a luminance value ($L_0$) measured in the normal direction of the surface light source is 100%, a luminance value ($L_{50}$) measured in the direction of 50° from the normal direction of the surface light source is 25% or more.

* * * * *